United States Patent
Riise et al.

(10) Patent No.: US 8,280,624 B2
(45) Date of Patent: Oct. 2, 2012

(54) METHOD OF DETERMINING A LIKELY GEOGRAPHICAL LOCATION

(75) Inventors: Soren Riise, Ruislip (GB); Devesh Patel, Ruislip (GB)

(73) Assignee: Yahoo! Inc., Sunnyvale, CA (US)

( * ) Notice: Subject to any disclaimer, the term of this patent is extended or adjusted under 35 U.S.C. 154(b) by 990 days.

(21) Appl. No.: 10/680,495

(22) Filed: Oct. 7, 2003

(65) Prior Publication Data

US 2005/0060430 A1    Mar. 17, 2005

(30) Foreign Application Priority Data

Sep. 13, 2003  (GB) ................................... 0319018.8

(51) Int. Cl.
*G06F 7/00* (2006.01)

(52) U.S. Cl. ........ 701/409; 707/708; 707/713; 707/729; 709/219; 455/456.1

(58) Field of Classification Search .......... 701/213, 701/200, 227, 203, 207, 409; 342/450, 457; 380/258; 709/227, 219, 216, 217, 203; 707/102, 707/708, 722, 723, 713, 727, 729, 706, 707, 707/E17.001; 715/856; 455/456.3, 456.1
See application file for complete search history.

(56) References Cited

U.S. PATENT DOCUMENTS

| | | | |
|---|---|---|---|
| 6,249,252 B1 * | 6/2001 | Dupray | 342/450 |
| 6,317,718 B1 * | 11/2001 | Fano | 705/14.39 |
| 6,356,905 B1 * | 3/2002 | Gershman et al. | 1/1 |
| 6,377,961 B1 | 4/2002 | Ryu | |
| 6,523,021 B1 | 2/2003 | Monberg | |
| 6,807,571 B2 * | 10/2004 | Hatano et al. | 709/219 |
| 6,922,567 B1 | 7/2005 | Rydbeck | |
| 7,092,901 B2 * | 8/2006 | Davis et al. | 705/26 |
| 7,114,124 B2 * | 9/2006 | Brindle | 715/253 |
| 7,127,068 B2 * | 10/2006 | Sundaravel et al. | 380/258 |
| 7,209,756 B2 * | 4/2007 | Yabe et al. | 455/456.3 |
| 7,257,570 B2 | 8/2007 | Riise | |
| 2001/0047354 A1 * | 11/2001 | Davis et al. | 707/3 |
| 2001/0055393 A1 | 12/2001 | Sundaravel | |
| 2002/0087505 A1 | 7/2002 | Smith | |
| 2002/0138479 A1 | 9/2002 | Bates | |
| 2003/0036949 A1 | 2/2003 | Kaddeche | |
| 2003/0061211 A1 | 3/2003 | Shultz | |
| 2003/0110293 A1 | 6/2003 | Friedman et al. | |
| 2003/0225893 A1 * | 12/2003 | Roese et al. | 709/227 |

(Continued)

FOREIGN PATENT DOCUMENTS

WO    WO 00/41090    7/2000

(Continued)

OTHER PUBLICATIONS

EP Full Search Report for corresponding app EP04017881; 3 pages; Jan. 29, 2009.

(Continued)

*Primary Examiner* — Ronnie Mancho

(74) *Attorney, Agent, or Firm* — Brinks Hofer Gilson & Lione

(57) ABSTRACT

A method of determining a likely geographical location for which a user of a computer desires further information based on submitted criteria comprising the steps of: the user submitting criteria including a locality name; identifying from the criteria the locality name; returning, in dependence on the locality name, a probability that the locality name is associated with a geographical location.

14 Claims, 1 Drawing Sheet

U.S. PATENT DOCUMENTS

Figure 2:
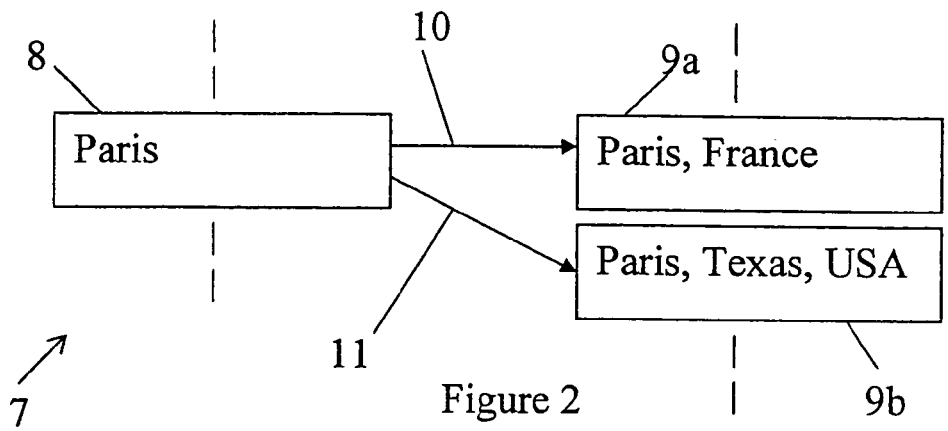

2005/0048986 A1    3/2005   Zhao
2005/0065916 A1    3/2005   Ge
2005/0256766 A1*   11/2005  Garcia et al. .................... 705/14

FOREIGN PATENT DOCUMENTS

WO      00/51359        8/2000
WO      2003102738      12/2003

OTHER PUBLICATIONS

Partial Search Report re corresponding EP Application 04017881.6; Oct. 28, 2008, 6 pages.

Rauch E et al; "A confidence-based framework for disambiguating geographic terms" HLT/NAACL—2003 Conference; Workshop 9: Analysis of Geographic References; May 31, 2003; pp. 50-54.

Bilhaut F et al; "Geographic reference analysis for geographic document querying" HLT/NACCL—2003 Conference; Workshop 9: Analysis of Geographic References; May 31, 2003; pp. 55-62.

McCurley; "Geospatial Mapping and Navigation of the Web"; Tenth Intl. World Wide Web Conference; May 5, 2001; pp. 221-229.

* cited by examiner

METHOD OF DETERMINING A LIKELY GEOGRAPHICAL LOCATION

This invention relates to a method of determining a likely geographical location for which a user of a computer desires further information based on submitted search criteria.

The geographic locations of a user of a network and the network sites that a user may visit or reference have become increasingly important information for Internet Service Providers, Portals and Search Engines, particularly for Internet-based services where advertisers which to send content which is relevant, i.e. local to the user.

Some attempts to include location information in the encoding of a web page include using a country identifier such as uk.example.com or example.co.uk. More recent attempts to deliver local-based content revolve around the mapping of a user's IP address to a geographic locality, this information being derived from the global distribution of International Phase addresses by the Internet Standards Governing Bodies (RIPE, ARIN, LAPNIC, APNIC) and the sane for the processed for distribution by other commercial entities. Thus, even though a user is accessing a global Internet site, the IP address will signify to the site being visited the geographic location of the user to enable delivery of content local to the user. The geographical location information obtained from standards bodies and commercial vendors maps down to country level with reasonable confidence level, while location down to city level is available, but of variable quality and reliability.

Local content that might be delivered to a user of known location includes listing of services and/or product providers, information such as entertainment, local news, advertising, weather, traffic information and the like.

There is a further problem which has hitherto not been addressed which is the inability of an Internet search engine or the like to make a determination or at least provide a chance or probability of identifying which particular geographical location a user is searching for when the user enters locality names as search terms or criteria. For example, a user entering the search criteria "paris hotels" might be looking to identify hotels in any one distinct geographical locations of Paris, France, USA (Texas, Tennessee, Arkansas, Missouri . . . ), Canada, Indonesia, Congo, Turkey, etc.

It is an object of the present invention to seek to overcome such difficulties and provide a mechanism for the context of location, thereby increasing relevance of a user query in delivering local content information to a user.

Accordingly, the present invention provides a method of determining a likely geographical location for which a user of a computer desires further information based on submitted criteria comprising the steps of: the user submitting criteria including a locality name; identifying from the criteria the locality name; returning, in dependence on the locality name, a probability that the locality name is associated with a geographical location.

A further aspect of the present invention provides a method of determining a likely geographical location of a network user based on criteria submitted by the user, the method comprising the steps of: holding geographic location information mapped from a user's computer network address; monitoring submitted criteria including a locality name; determining if the locality name is a sub-location within the geographic location indicated by the geographic location information mapped from a user's network address; refining the geographic location information mapped from a user's network address to indicate a probability that the user is located in the sub-location.

Another aspect of the present invention provides a location module to determine a likely geographical location for which a user of a computer desires further information based on submitted criteria, the module comprising: an input to receive criteria submitted by the user including a locality name; a comparator to identify from the criteria the locality name; a processor to return, in dependence on the locality name, a probability that the locality name is associated with a geographical location.

A further aspect of the present invention provides a location module to refine a likely geographical location of a network user based on criteria submitted by the user, the location module comprising: a store to hold geographic location information mapped from a user's computer network address; and a processor to monitor criteria submitted by the user including a locality name and to determine if the locality name is a sub-location within the geographic location indicated by the geographic location information mapped from a user's network address and to refine the geographic location information mapped from a user's network address to indicate a probability that the user is located in the sub-location.

Figure 3:
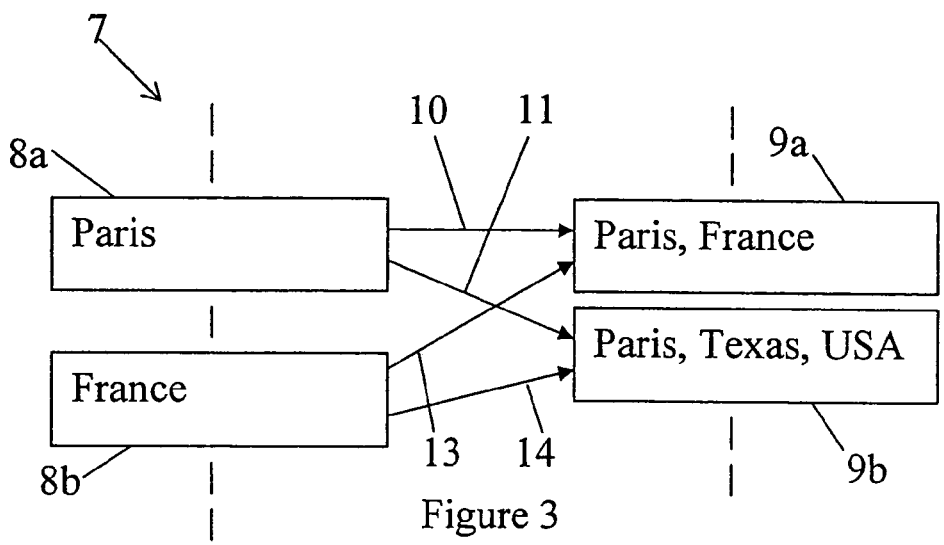
Figure 1:
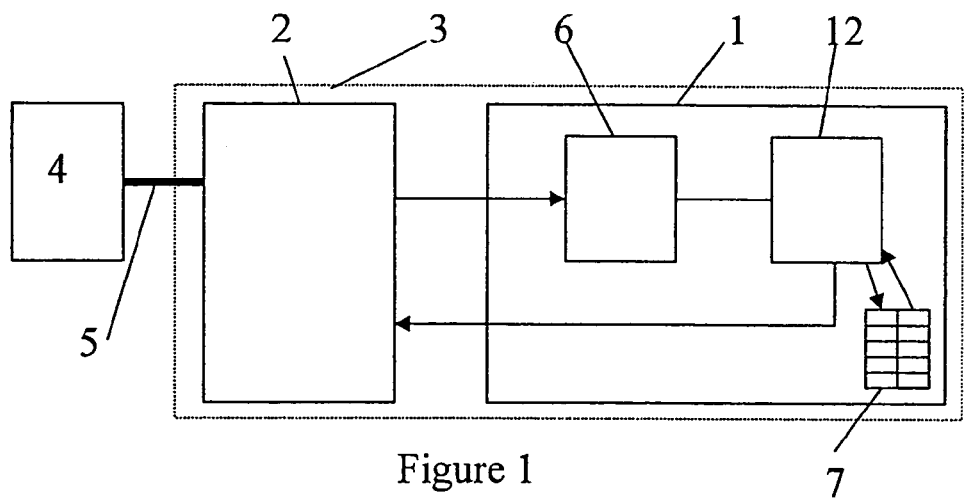

In order that the present invention may be more readily understood, embodiments thereof will now be described, by way of example, with reference to the accompanying drawings, in which:

FIG. 1 is a schematic block diagram of a system incorporating a location module embodying the present invention; and FIGS. 2 and 3 are examples of look-up tables for use with embodiments of the present invention.

The invention is described below particularly in relation to an Internet-based search engine interrogated by an Internet-based user from a computer such as a desktop PC but it should be appreciated that the invention is equally applicable to non-Internet-based search engines and computers operating in other network environments such as cellular and mobile communication networks. The invention is also readily applicable to implementation on various forms of computer such as: desktop PC, portable PC, Personal Digital Assistant (PDA), mobile telephone or other mobile communication device.

Referring to FIG. 1, the invention is, in this example, configured as a location module 1 shown as being distinct from a search engine 2. However, the location module can also be incorporated in the search engine as shown by phantom line 3. In one example of the present invention utilising a conventional Internet-based search engine, a user of a computer 4 linked over a network 5, preferably the Internet, enters a search term or search criteria as text in a search field including one or names of localities for which the user is searching for further information. In this example, the user enters "Hotels Paris" as the user is trying to identify Internet sites providing information about hotels in the geographical location of the city of Paris, France.

Once the search criteria incorporating at least one locality name (in this case "Paris") has been submitted to the search engine 2, the location module 1 reviews and parses the search criteria and divides the submitted text into text which is or might be locality names and text which is not a locality name. A comparator 6 tests the text which is or might be locality names against a table (described below) of known locality names to verify whether the submitted criteria includes locality names. Thus, the locality names are identified from the search criteria by the location module.

There is a link between the identified locality name and one or more geographical locations. In a preferred example, the link is embodied as a probability vector in a lookup table 7

(see FIG. 2) between an identified locality name 8 and one or more geographical locations 9. The specific probabilities can be established heuristically but, in any event, represent the likelihood of the searched for locality name being at a particular one of the geographical locations. Referring to FIG. 2, the locality name 8 is "Paris" on one side of the table 7 and is linked to the two possible geographical locations 9a,9b of "Paris, France" and "Paris, Texas, USA" by respective probability vectors 10,11.

The vector probabilities 10,11 linking between the locality name and the geographical location are returned to the search engine by a processor 12 of the location module, in dependence on the locality name, as the respective probabilities that that specific locality name 1 is associated with those two geographical locations 2. The processor may include the table 7 or have access thereto as shown in FIG. 3.

A determination is made by the location module or the search engine as to which of the geographical locations 9a,9b was intended by the user based on the probability results: preferably by electing the higher of the two probabilities 10,11.

The search engine 2 can then provide search results limited to or refined by the geographical location determined by the location module 1 as well as providing to the user 4 news, advertising content or the like local to the geographical location determined by the location module.

If the search criteria includes more than one locality name, for example "Hotels Paris France" as in FIG. 3, then the location module 1 identifies each of the locality names "Paris" 8a and "France" 8b and provides, in dependence on each locality name 8a,8b, a vector probability 10,11,13,14 that each of the locality names is associated with a geographical location but importantly then also combines the returned probabilities to return a probability that the plurality of location names is associated with a geographical location. The extraction of the location-based words is done using a grill-based algorithm using a global hierarchical data set for town, provinces and countries which will allow the parser to understand the relationship between each word when combining multiple vectors to derive likelihood of user interests in either Paris, France, of Paris, Texas. Preferably, the step of combining selected ones of multiple probability vectors 10,11,13,14 is by way of a dot product (although the combination step is not limited to this function). The combined probability, in this case of vector probabilities 10 and 13 being the two highest probabilities returns a very high probability in this example that the geographic location is Paris, France. The composite probability is then returned by the location module 1 to the search engine 2 to provide search results limited to or refined by the geographical location determined by the location module as well as providing news, advertising content or the like local to the geographical location determined by the location module.

Rather than making a determination, the location module can return the probabilities to the user as a list of possible geographic locations from which the user can manually select or confirm a geographic location.

In the case of the Internet, the computer of the user will have an IP address (it should be appreciated that when a computer is part of a network, not necessarily the Internet, the computer will have a network address). The IP address is mapped to a geographical location. The vector probabilities 10,11 can be weighted by the geographical location mapped from the user's IP address. Thus, if a user's IP address indicates that the user is located in Northern Texas, then the likelihood is that that user is probably looking for hotels in Paris, Texas as opposed to Paris, France. Accordingly, the location module manipulates the vector probabilities in the look-up table in dependence on the mapped geographical location indicated by the network address. This weighting of the vector probabilities can affect the outcome of any determination by the search engine or location module—i.e. when unweighted, the probability vectors clearly favour Paris, France as the more probable searched for geographic location of the two possibilities in FIG. 1 but, as shown in FIG. 2, factoring in the weighting in dependence on the user's IP address mapped location, in Northern Texas, shifts the probability vectors such that Paris, Texas is the more likely searched for geographic location.

It is possible to implement the same system for searches initiated in mobile cell phone network environments, but rather than using IP addresses for identification of the user location, the user location is determined by existing network infrastructure such as GNLC or GBS units as supported by the particular network.

The above description relates to the returning of a probability or determination based upon vector probabilities. Other means for returning a probability or determination that a searched for locality name relates to one or more specific geographic locations are possible and include: linking a locality name to one or more of the geographic locations, the locality names and the geographic locations being configured in a decision graph; linking a locality name to one or more of the geographic locations, the locality names and the geographic locations being configured in a neural network having an output layer comprising the or each returned probability; an genetic programming and algorithm, where a population of slightly different versions of the location module 1 are running in parallel. The end application (i.e. search engine 2) will report successful behaviour in terms of user clicks, which then in turn can be used to drive the selection criteria for the genetic algorithm when dynamically creating the next generation of location modules.

The invention also allows the geographic location information mapped from a user's IP address to be refined. In this regard, the location module already holds or can request a likely geographical location of a network user based on geographic location information mapped from a user's computer IP address in the case of the network being the Internet. The location module continually monitors or samples search criteria submitted by a user, including any locality names in the search criteria. If the user's IP address is mapped to London, for example, and the user enters a search criterion comprising "Islington restaurants", then there is a high probability that the London user is at the geographical location of Islington within London, Islington being a sub-location of the geographic location of London. Thus, the location module determines if the locality name "Islington" is a sub-location within the geographic location "London" indicated by the geographic location information mapped from a user's IP address, preferably by way of a look-up table similar to that described above. After a statistically significant number of samples of search criteria have been monitored by the location module for locality names which are a sub-location of the geographic location information mapped from a user's IP address, a probability can be returned that the user is located in one or more of the identified sub-locations. The geographic location information mapped from the user's IP address can then be refined if the probability is above a given threshold to indicate that the user is located in one of the sub-locations. That information can then be held by the location module for subsequent use in directing content local to the identified sub-location to the user.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A computer-implemented method for determining a likely geographical location for which a querying user of a computer desires further information based on submitted criteria, the method comprising the steps of:
    receiving, at an internet-based search engine, search criteria comprising text that comprises a locality name;
    separating the text of the search criteria into text that may be a name of a locality and text that is not a name of a locality;
    comparing the text that may be a name of a locality to a data set comprising at least one of town, province, or country names to verify the locality name in the text of the search criteria;
    determining, with a processor, a probability that the locality name in the text of the search criteria is associated with a geographical location; and
    providing, with the processor, to a user providing the search criteria, information that comprises search results that are refined based on the probability that the locality name in the text of the search criteria is associated with a geographic location.

2. The method of claim 1, wherein the returned probability indicates a probability of the locality name in the text of the search criteria being associated with each of a plurality of geographic locations.

3. The method of claim 1, wherein the text of the search criteria includes a plurality of locality names, and wherein the method further comprises the steps of:
    identifying each locality name of the plurality of locality names in the text of the search criteria;
    determining, for each locality name of the plurality of locality names, a probability that the locality name is associated with a geographical location; and
    combining the probabilities to return a composite probability that indicates the probability of the plurality of locality names being associated with a geographical location.

4. The method of claim 3, wherein the composite probability indicates the probability of each of the plurality of locality names being associated with each of a plurality of geographic locations.

5. The method of claim 3, wherein the composite probability is derived from a combination of each of the probabilities associated with each of the plurality of locality names.

6. The method of claim 1, wherein determining a probability comprises determining a set of probabilities between a plurality of locality names and a plurality of geographic locations, there being a probability linking a locality name of the plurality of locality names to one or more of the geographic locations of the plurality of geographic locations.

7. The method of claim 1, wherein the search criteria is received from a computer that is part of a network and has a network address, the network address being mapped to a geographical location, and wherein the method further comprises the step of:
    weighting the probability that the locality name in the text of the search criteria is associated with the geographic location based on the geographical location mapped to the network address.

8. The method of claim 7, wherein the network is the Internet and the network address is the IP address of the computer.

9. The method of claim 7, wherein the computer is one of the group consisting of: a desktop PC, a portable PC, a Personal Digital Assistant (PDA), a mobile telephone and a mobile communication device.

10. The method of claim 1, further comprising the step of determining a geographical location associated with the name of the locality name in the text of the search criteria based on the probability that the locality name in the text of the search criteria is associated with a geographic location.

11. The method of claim 1, wherein the probability that the locality name in the text of the search criteria is associated with a geographic location is determined based on a look-up table that associates locality as a probability vector.

12. A method of determining a likely geographical location of a network user based on criteria submitted by the user, the method comprising the steps of:
    holding in a location module geographic location information mapped from a user's computer network address that is an IP address;
    monitoring submitted criteria including a locality name;
    determining if the locality name is a sub-location within the geographic location indicated by the geographic location information mapped from the user's network address;
    refining the geographic location information mapped from the user's network address to indicate a probability that the user is located in the sub-location; and
    using the indicated probability to determine a likely geographical location and to provide to the user information that relates to the likely geographic location.

13. The method of claim 12 wherein the information comprises a list of internet sites.

14. A computer-readable storage medium comprising a set of instructions for determining a likely geographical location for which a querying user of a computer desires further information based on submitted criteria, the set of instructions to direct a processor to perform acts of:
    receiving, at an internet-based search engine, search criteria comprising text that comprises a locality name;
    separating the text of the search criteria into text that may be a name of a locality and text that is not a name of a locality;
    comparing the text that may be a name of a locality to a data set comprising at least one of town, province, or country names to verify the locality name in the text of the search criteria;
    determining a probability that the locality name in the text of the search criteria is associated with a geographical location; and
    providing to a user providing the search criteria, information that comprises search results that are refined based on the probability that the locality name in the text of the search criteria is associated with a geographical location.

* * * * *